United States Patent [19]

Fujiwara

[11] Patent Number: 5,477,349
[45] Date of Patent: Dec. 19, 1995

[54] LIQUID CRYSTAL INJECTING METHOD

[75] Inventor: Atsushi Fujiwara, Oome, Japan

[73] Assignee: Casio Computer Co., Ltd., Tokyo, Japan

[21] Appl. No.: 229,453

[22] Filed: Apr. 18, 1994

[30] Foreign Application Priority Data

Apr. 27, 1993 [JP] Japan .................................. 5-122167
Apr. 27, 1993 [JP] Japan .................................. 5-122168
Apr. 27, 1993 [JP] Japan .................................. 5-122169

[51] Int. Cl.$^6$ .......................... G02F 1/1341; B65B 31/02
[52] U.S. Cl. .................................... 359/36; 359/62; 141/7
[58] Field of Search .............................. 359/62, 80, 36, 359/900; 141/1, 4, 7, 31, 18, 21, 65; 430/20

[56] References Cited

U.S. PATENT DOCUMENTS

| 4,099,550 | 7/1978 | Matsuzaki et al. | 141/51 |
| 4,753,276 | 6/1988 | Inaba et al. | 141/7 |
| 5,029,623 | 7/1991 | Brosig | 141/7 |
| 5,269,351 | 12/1993 | Yoshihara | 141/7 |

FOREIGN PATENT DOCUMENTS 2-239225  9/1990  Japan .
4-367824  12/1992  Japan .

Primary Examiner—William L. Sikes
Assistant Examiner—Tai V. Duong
Attorney, Agent, or Firm—Frishauf, Holtz, Goodman, Langer & Chick

[57] ABSTRACT

A liquid crystal injecting method, wherein the area of a portion of a liquid crystal cell, which is dipped in a liquid crystal contained in a liquid crystal vessel, is reduced to a minimum, thereby preventing the liquid crystal in the vessel from being contaminated with foreign matter and reducing the amount of the liquid crystal which unnecessarily adheres to the outer surface of the cell. The liquid level of the liquid crystal in the vessel is detected by a sensor. Liquid crystal is supplied to the vessel on the basis of the detected liquid level to maintain the liquid level at a predetermined height. A portion of the liquid crystal is raised. A liquid crystal injecting port of the cell is dipped into the raised portion of the liquid crystal after an inner space of the cell is evacuated. Thus, the liquid crystal is injected into the cell. Since only the injecting port of the cell is dipped into the liquid crystal in the vessel, the area of the cell which contacts the liquid crystal is reduced, thereby preventing the liquid crystal from contamination by foreign matters adhering to the cell. Further, since the amount of the liquid crystal adhered to the outer surface of the cell is reduced, the liquid crystal can be saved.

18 Claims, 6 Drawing Sheets

LIQUID CRYSTAL INJECTING METHOD

BACKGROUND OF THE INVENTION

1. Field of the Invention

The present invention relates to a liquid crystal injecting method for injecting liquid crystal into a liquid crystal cell.

2. Description of the Related Art

In general, a liquid crystal panel is constituted by two transparent substrates arranged to oppose to each other and bonded to each other with a sealing member interposed therebetween, on opposing surfaces of the transparent substrates transparent electrodes being formed, and liquid crystal injected in a space located between the transparent substrates and surrounded by the sealing material.

To manufacture such a liquid crystal panel, as shown in FIG. 6A, for example, first, an empty liquid crystal cell 4 is prepared by bonding two transparent substrates 1 and 2 with a sealing member 3 interposed therebetween, and not by injecting liquid crystal in a space located between the substrates 1 and 2 and surrounded by the sealing member 3. In this case, a liquid crystal injecting port 5 is formed in a center of a bottom portion of the sealing material 3 of the liquid crystal cell 4. The liquid crystal cell 4 is placed above a liquid crystal vessel 7 in a chamber 6. Then, the chamber 6 is evacuated by means of a vacuum pump (not shown) connected to the chamber 6 through a pipe 8. As a result, the inner space of the liquid crystal cell 4 is evacuated through the liquid crystal injecting port 5. Thereafter, as shown in FIG. 6B, the bottom portion of the liquid crystal cell 4 is dipped into liquid crystal 9 contained in the liquid crystal vessel 7. In this state, atmosphere is introduced into the vacuum chamber 6 through the pipe 8, resulting in that the liquid crystal 9 is injected into the inner space of the liquid crystal cell 4 through the liquid crystal injecting port 5. Then, the liquid crystal cell 4 is taken out from the chamber 6, and the liquid crystal injecting port 5 is sealed with sealing material (not shown).

In the conventional liquid crystal injecting method as described above, since all the bottom portion of the liquid crystal cell 4, in which the liquid crystal injecting port 5 is formed, is dipped into the liquid crystal 9 in the liquid crystal vessel 7, the area of that portion of the liquid crystal cell 4 which is dipped in the liquid crystal 9 is considerably large relative to the size of the liquid crystal injecting port 5. Therefore, a large amount of foreign substances adhere on an outer surface of the liquid crystal cell 4 or impurities such as alkaline components of the transparent substrates 1 and 2 (if the transparent substrates are made of glass) are mixed in the liquid crystal 9, resulting in contamination and degradation of the liquid crystal 9. If the contaminated liquid crystal 9 is injected into the liquid crystal cell 4, the quality of display may be lowered. In addition, the liquid crystal 9 unnecessarily adhered to the outer surface of the bottom portion of the liquid crystal cell 4 must be cleaned with a solvent in a subsequent step. Thus, expensive liquid crystal is wasted in a large amount, which increases the cost of manufacturing liquid crystal panels.

SUMMARY OF THE INVENTION

The present invention has been made in consideration of the above problems of the conventional art, and its object is to provide a liquid crystal injecting method, wherein the area of a portion of the liquid crystal cell which is dipped into the liquid crystal contained in the liquid crystal vessel is reduced to a minimum, thereby preventing the liquid crystal in the liquid crystal vessel from being contaminated and reducing the amount of the liquid crystal which unnecessarily adheres to the outer surface of the liquid crystal cell.

In order to achieve the above described object, a liquid crystal injecting method of this invention, for injecting a liquid crystal into an inner space of a liquid crystal cell through a liquid crystal injecting port formed therein, comprises the steps of:

- detecting a liquid level of a liquid crystal contained in a liquid crystal vessel;
- supplying liquid crystal to the liquid crystal vessel based on a result of the step of detecting the liquid level of the liquid crystal;
- forming a surface raised portion of the liquid crystal by raising a part of the liquid crystal to a level higher than the other part thereof;
- dipping the liquid crystal injecting port of the liquid crystal cell into the surface raised portion of the liquid crystal; and
- injecting the liquid crystal into the inner space of the liquid crystal cell through the liquid crystal injecting port.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Figure 1A:
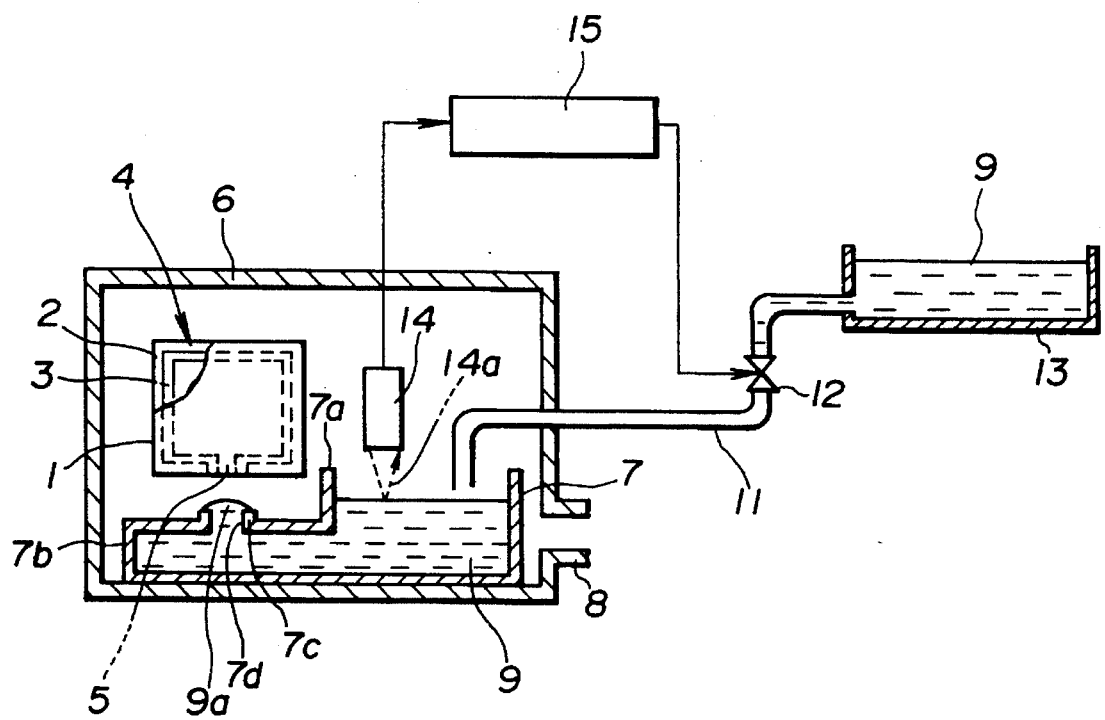
FIG. 1A is a cross-sectional view schematically showing a structure of a liquid crystal injecting apparatus used in a first embodiment of the present invention.
Figure 6A:
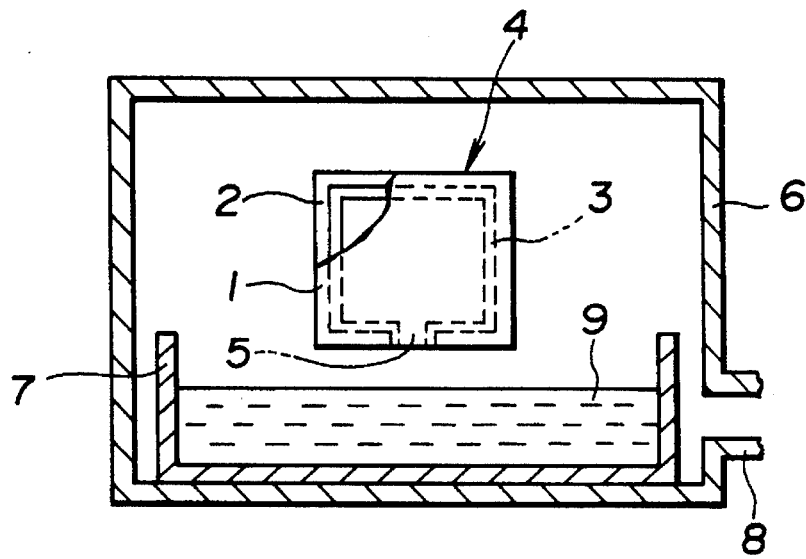
FIG. 6A is a cross-sectional view schematically showing a conventional liquid crystal injecting apparatus.
Figure 6B:
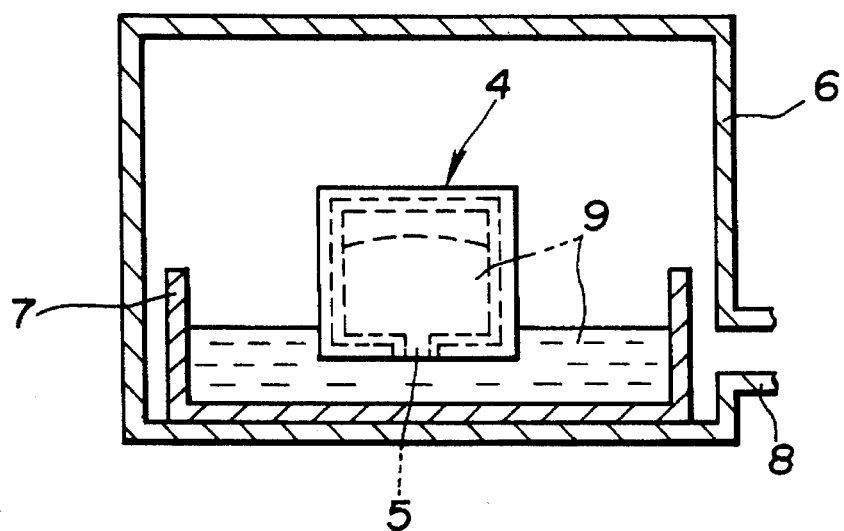
FIG. 6B is a cross-sectional view schematically showing a state in which liquid crystal is injected into a liquid crystal cell in the conventional liquid crystal injecting apparatus of FIG. 6A.

FIG. 1A schematically shows a structure of a liquid crystal injecting apparatus used in a first embodiment of the present invention. In this figure, structural elements which are the same as those in the conventional liquid crystal injecting apparatus shown in FIG. 6A are identified with the same reference numerals, and descriptions thereof are omitted.

A liquid crystal vessel 7 of the liquid crystal injecting apparatus comprises an open vessel portion 7a having an opened upper surface, a closed vessel portion 7b having a closed upper surface and communicating with the open vessel portion 7a, and a liquid surface raising portion 7c mounted on a predetermined position of the upper surface of the closed vessel portion 7b. The liquid surface raising portion 7c is constructed by a cylindrical projection having an opening 7d, a plurality of cylindrical projections arranged at regular intervals, each having an opening 7d, or a long and narrow projection having an elongated opening 7d. When the liquid crystal vessel 7 is filled with a predetermined amount of liquid crystal 9, a surface raised portion 9a of the liquid crystal 9 is formed above the liquid surface raising portion 7c owing to the surface tension of the liquid crystal. Thus, a part of the liquid crystal 9 contained in the liquid crystal vessel 7 can be raised from the upper surface of the closed vessel portion 7b.

One end of a liquid crystal supplying pipe 11 is positioned above the open vessel portion 7a. The other end of the liquid crystal supplying pipe 11 is projected outside the chamber 6 and connected to an external liquid crystal vessel 13 via an electromagnetic valve 12. Further, a liquid level detecting sensor 14 is positioned above the open vessel portion 7a. The liquid level detecting sensor 14 emits a laser beam 14a downward and detects the laser beam 14a reflected by a surface of the liquid crystal 9 contained in the open vessel portion 7a, thereby detecting the liquid level of the liquid crystal 9 in the open vessel portion 7a. A detection signal output from the liquid level detecting sensor 14 is supplied to a control circuit 15, and the circuit 15 controls opening and closing of the electromagnetic valve 12 based on the detection signal. Elevator means (not shown) having a motor and the like, for supporting the liquid crystal cell 4 and moving it upward and downward, is provided in a predetermined portion above the liquid surface raising portion 7c in the chamber 6.

Figure 1B:
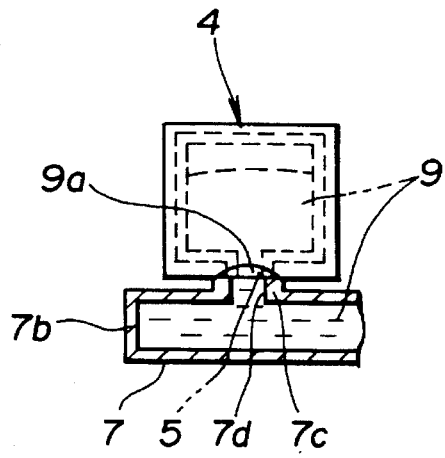
FIG. 1B is a cross-sectional view schematically showing a state in which liquid crystal is injected into a liquid crystal cell in the liquid crystal injecting apparatus of FIG. 1A.

The liquid crystal 9 is injected into the liquid crystal cell 4 by means of the liquid crystal injecting apparatus in the following manner. First, the liquid crystal cell 4 is positioned at an upper limit position in the chamber 6. Then, the chamber 6 is hermetically sealed. Thereafter, the chamber 6 is evacuated by the vacuum pump connected to the pipe 8, thereby evacuating the liquid crystal cell 4 via the liquid crystal injecting port 5. Subsequently, the liquid crystal cell 4 is lowered to a lower limit portion by the elevator means. In this state, as shown in FIG. 1B, the liquid crystal injecting port 5 formed at the lower end portion of the liquid crystal cell 4 is brought into contact with or close proximity to an upper surface of the liquid surface raising portion 7c. As a result, the liquid crystal injecting port 5 is dipped into the surface raised portion 9a of the liquid crystal 9 formed in the opening 7d of the liquid surface raising portion 7c. In this state, when atmosphere is introduced into the chamber 6, the liquid crystal 9 in the surface raised portion 9a is injected into the inner space of the liquid crystal cell 4 through the liquid crystal injecting port 5. As a result, the inner space of the liquid crystal cell 4 is filled with the liquid crystal 9.

when the upper surface of the liquid crystal 9 in the open vessel portion 7a is lowered as the liquid crystal 9 is injected into the inner space of the liquid crystal cell 4, the liquid level detecting sensor 14 detects the lowering of the liquid level and supplies a detection signal to the control circuit 15. The control circuit 15 opens the electromagnetic valve 12 based on the detection signal, resulting in that the liquid crystal 9 in the external liquid crystal vessel 13 is supplied to the open vessel portion 7a through the liquid crystal supplying pipe 11. When the liquid level of the liquid crystal 9 in the open vessel portion 7a is raised to a predetermined height, the liquid level detecting sensor 14 detects the rise of the liquid level and supplies a detection signal to the control circuit 15. The control circuit 15 closes the electromagnetic valve 12 based on the detection signal, resulting in a stop of the supply of the liquid crystal 9 from the external liquid crystal vessel 13 to the open vessel portion 7a through the liquid crystal supplying pipe 11. The above operations are repeated, so that the liquid level of the liquid crystal 9 in the open vessel portion 7a can be maintained at a predetermined height. When the inner space of the liquid crystal cell 4 is filled with the liquid crystal 9, it is taken out from the chamber 6 and the liquid crystal injection port 5 is sealed with a sealing material (not shown). Thus, the process of injecting the liquid crystal into the inner space of the liquid crystal cell 4 is completed.

In the liquid crystal injecting apparatus as described above, a part of the surface of the liquid crystal 9 in the liquid crystal vessel 7 is raised, the liquid crystal injecting port 5 is dipped into the surface raised portion 9a of the liquid crystal 9, and, in this state, the liquid crystal 9 in the liquid crystal vessel 7 is injected into the inner space of the liquid crystal cell 4 through the liquid crystal injecting port 5. Therefore, the area of the portion of the liquid crystal cell 7, which is dipped into the liquid crystal 9 in the liquid crystal vessel 7, can be reduced to a minimum. As a result, only a very small amount of impurities, such as foreign substances adhered on the outer surface of the liquid crystal cell 4, is mixed in the liquid crystal 9. Consequently, the liquid crystal 9 in the liquid crystal vessel 7 is not easily contaminated and the degradation of the liquid crystal 9 due to contamination is reduced to a minimum.

Further, since the liquid crystal 9 adheres only to a portion of the outer surface of the liquid crystal cell 4 located around the liquid crystal injecting port 5, the amount of the liquid crystal which adheres to the liquid crystal cell 4 is reduced as compared to that in the conventional art. Although the adhered liquid crystal is cleaned in a subsequent step, the expensive liquid crystal can be considerably saved. Thus, the manufacturing cost can be reduced in accordance with the amount of the saved liquid crystal. Furthermore, if the liquid surface raising portion 7c is formed of a plurality of cylindrical projections arranged at regular intervals or a long and narrow projection, the liquid crystal 9 can be injected simultaneously into a plurality of liquid crystal cells 4.

In the above embodiment, the liquid crystal vessel 7 has the closed vessel portion 7b, the liquid surface raising portion 7c mounted on the upper surface of the closed vessel portion 7b, and the surface raised portion 9a of the liquid crystal 9 is formed in the opening 7d of the liquid surface raising portion 7c owing to the surface tension of the liquid crystal 9. As a result, a part of the liquid crystal 9 in the liquid crystal vessel 7 is raised.

Figure 2A:
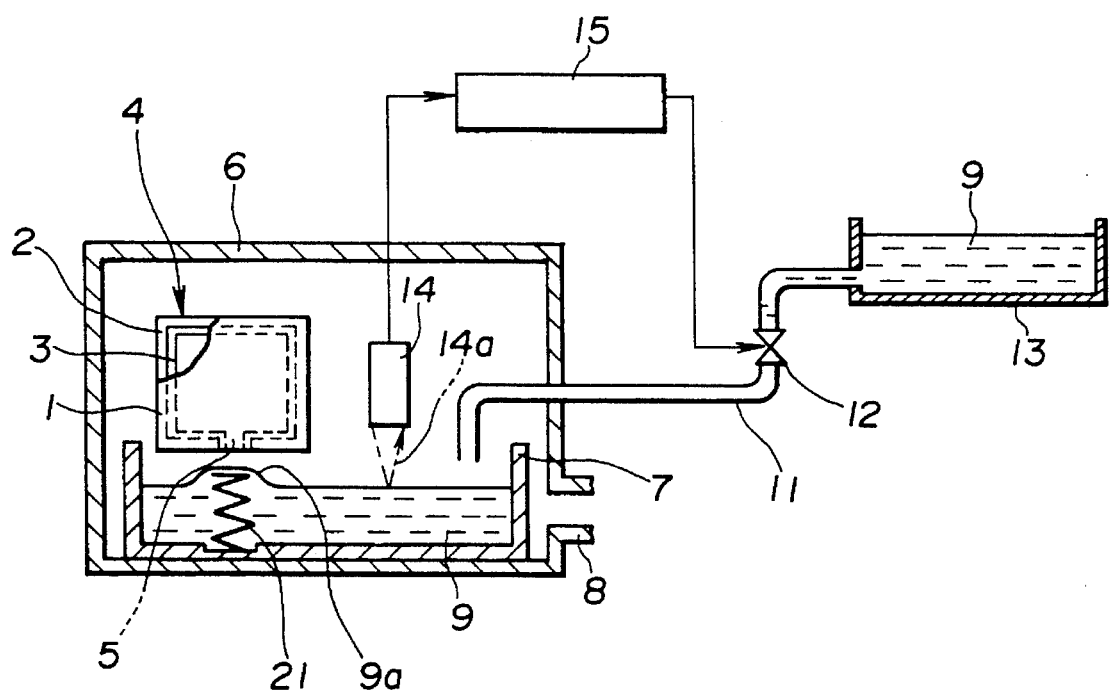
FIG. 2A is a cross-sectional view schematically showing a structure of a liquid crystal injecting apparatus used in a second embodiment of the present invention.

However, the present invention is not limited to this embodiment. For example, as shown in FIG. 2A, illustrating a second embodiment of the present invention, the shape of the liquid crystal vessel 7 can be a general concave, an upper end of which is opened entirely.

Figure 2B:
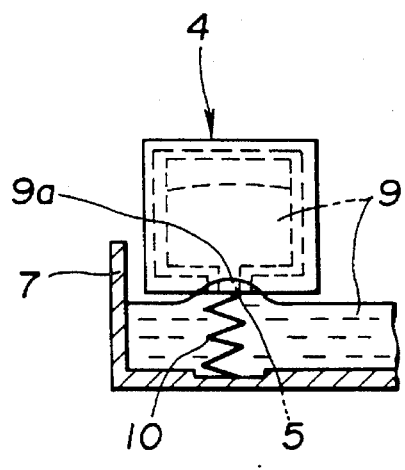
FIG. 2B is a cross-sectional view showing a state in which liquid crystal is injected into a liquid crystal cell in the liquid crystal injecting apparatus of FIG. 2A.

In the second embodiment, a coil spring (liquid surface raising member) 21 stands upright at a predetermined position in the liquid crystal vessel 7, so as to form a surface raised portion 9a of the liquid crystal 9 above the coil spring 21 owing to the surface tension of the liquid crystal 9, in order to raise a part of the liquid crystal 9 contained in the liquid crystal vessel 7. In this case, the coil spring 21 has a diameter greater than that of the liquid crystal injecting port 5 of the liquid crystal cell 4, so that the diameter of the surface raised portion 9a of the liquid crystal 9 is greater than the diameter of the liquid crystal injecting port 5. When the liquid crystal injecting port 5 of the liquid crystal cell 4 is pressed against an upper end of the coil spring 21 with a certain pressure as shown in FIG. 2B, the liquid crystal injecting port 5 is dipped into the surface raised portion 9a of the liquid crystal 9 formed on the upper end of the coil spring 21.

Figure 3A:
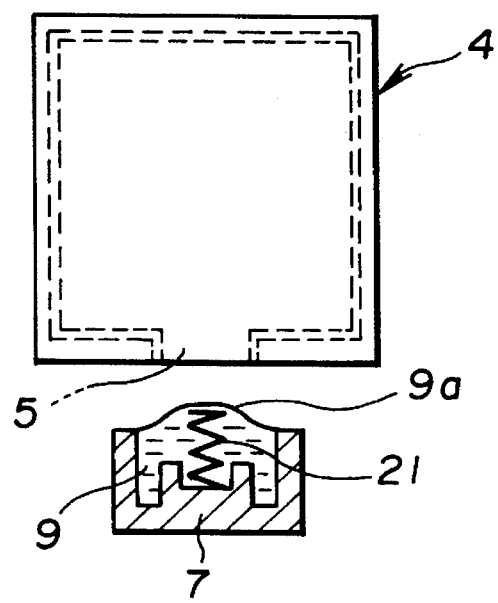
FIG. 3A is a cross-sectional view schematically showing a structure of a main portion of a liquid crystal injecting apparatus used in a third embodiment of the present invention.

FIG. 3A schematically shows a main portion of a third embodiment of the present invention. In this embodiment, as shown in FIG. 3A, the diameter of the coil spring 21 can be smaller than the diameter of the liquid crystal injecting port 5, so that the diameter of the surface raised portion 9a of the liquid crystal 9 is smaller than the diameter of the liquid crystal injecting port 5. In this case, however, the width of the liquid crystal vessel 7 is smaller than that of the liquid crystal cell 4 but slightly greater than the diameter of the liquid crystal injecting port 5. The liquid level of the liquid crystal 9 is set to a predetermined height when the liquid crystal 9 is fully filled in the liquid crystal vessel 7.

Figure 3B:
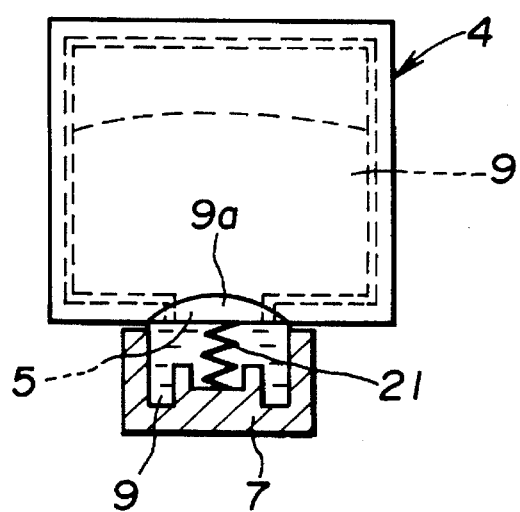
FIG. 3B is a cross-sectional view schematically showing a state in which liquid crystal is injected into a liquid crystal cell in the liquid crystal injecting apparatus of FIG. 3A.

When the liquid crystal injecting port 5 of the liquid crystal cell 4 is pressed against the upper end of the coil spring 21 with a certain pressure as shown in FIG. 3B, the coil spring 21 contracts, thereby reducing a gap between a lower end of the liquid crystal injecting port 5 and the upper end of the side wall of the liquid crystal vessel 7. As a result, the surface of the liquid crystal 9 in the liquid crystal vessel 7 around the liquid crystal injecting port 5 is raised owing to the surface tension. At this time, the diameter of the surface raised portion 9a becomes greater than that of the liquid crystal injecting port 5. Thus, although the diameter of the coil spring 21 is smaller than the that of the liquid crystal injecting port 5, the diameter of the surface raised portion 9a of the liquid crystal 9 can be greater than that of the liquid crystal injecting port 5, if the width of the liquid crystal vessel 7 is slightly greater than the diameter of the liquid crystal injecting port 5. Therefore, according to this embodiment, the liquid crystal 9 in the liquid crystal vessel 7 can be satisfactorily injected into the inner space of the liquid crystal cell 4 through the liquid crystal injecting port 5.

Figure 4:
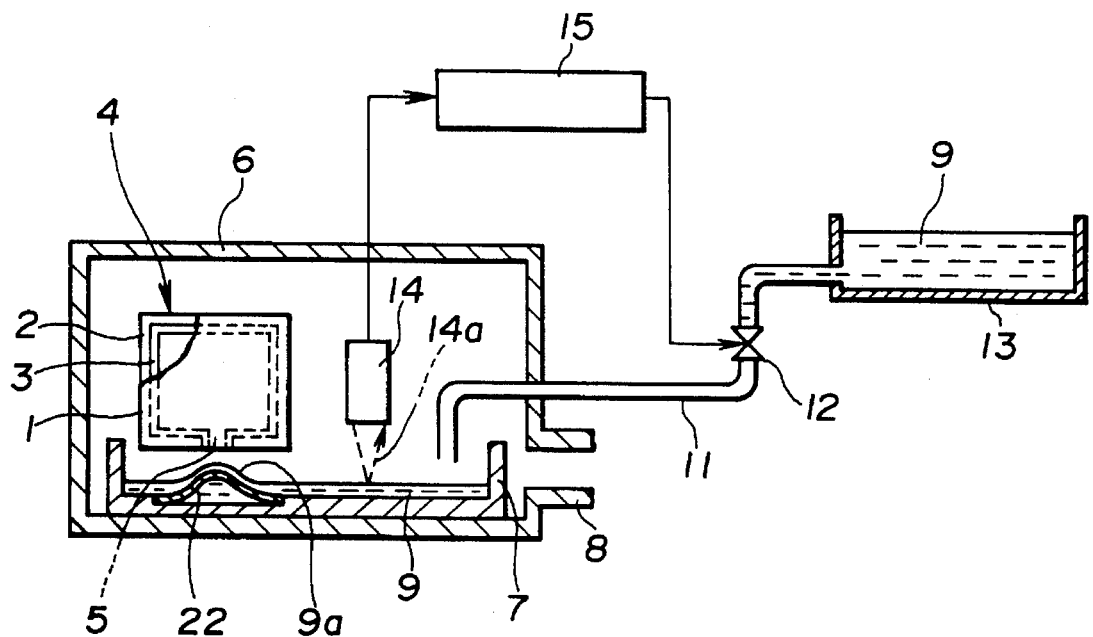
FIG. 4A is a cross-sectional view schematically showing a structure of a liquid crystal injecting apparatus used in a fourth embodiment of the present invention.
FIG. 4B is a cross-sectional view schematically showing a state in which liquid crystal is injected into a liquid crystal cell in the liquid crystal injecting apparatus of FIG. 4A.
Figure 4:
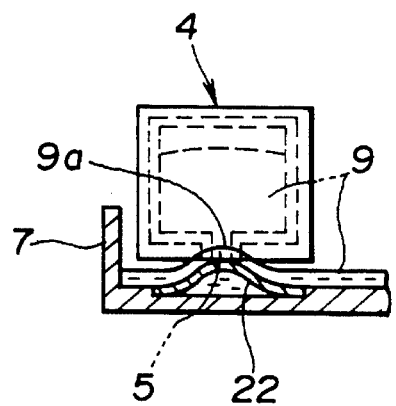

FIG. 4A schematically shows a fourth embodiment of the present invention. In this embodiment, as shown in FIG. 4A, a plate spring 22, which is bent like a rounded wave, is provided in the liquid crystal vessel 7, so as to form the surface raised portion 9a of the liquid crystal 9 above the plate spring 22 owing to the surface tension of the liquid crystal, in order to raise 9 part of the liquid crystal 9 contained in the liquid crystal vessel 7. In this case, the width of an upper end of the plate spring 22 is greater than the diameter of the liquid crystal injecting port 5, so that the width of the surface raised portion 9a of the liquid crystal 9 formed on the plate spring 22 is greater than the diameter of the liquid crystal injecting port 5. When the liquid crystal injecting port 5 of the liquid crystal cell 4 is pressed against the upper end of the plate spring 22 with a certain pressure as shown in FIG. 4B, the liquid crystal injecting port 5 is dipped into the surface raised portion 9a formed on the upper end of the plate spring 22.

Figure 5:
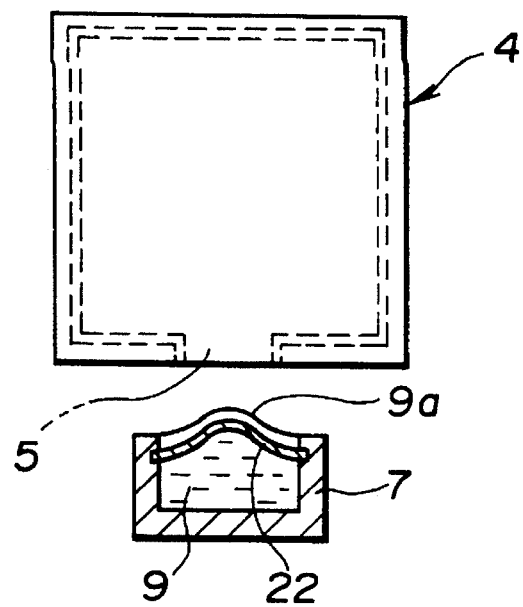
FIG. 5A is a cross-sectional view schematically showing a structure of a main portion of a liquid crystal injecting apparatus used in a fifth embodiment of the present invention.
FIG. 5B is a cross-sectional view schematically showing a state in which liquid crystal is injected into a liquid crystal cell in the liquid crystal injecting apparatus of FIG. 5A.
Figure 5:
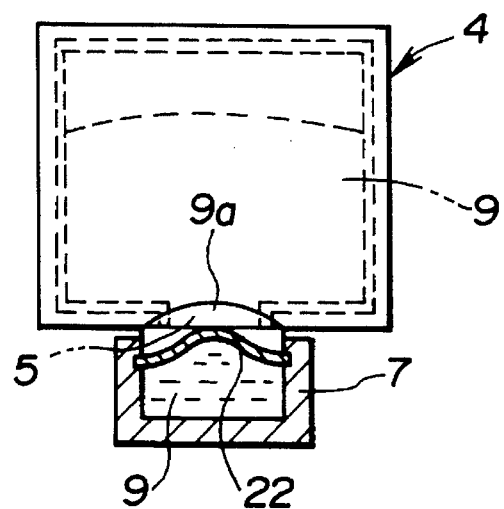

Further, FIG. 5A schematically shows a main portion of a fifth embodiment of the present invention. In this embodiment, as shown in FIG. 5A, the width of the top end of the plate spring 22 can be smaller than the diameter of the liquid crystal injecting port 5, so that the width of the surface raised portion 9a of the liquid crystal 9 is smaller than the diameter of the liquid crystal injecting port 5. In this case, however, as in the third embodiment, the width of the liquid crystal vessel 7 is smaller than that of the liquid crystal cell 4 but slightly greater than the diameter of the liquid crystal injecting port 5. The liquid level of the liquid crystal 9 is set to a predetermined height when the liquid crystal 9 is filled in the liquid crystal vessel 7.

When the liquid crystal injecting port 5 of the liquid crystal cell 4 is pressed against the upper end of the plate spring 22 with a certain pressure as shown in FIG. 5B, the plate spring 22 is bent, thereby reducing the gap between the lower end of the liquid crystal injecting port 5 and the upper end of the side wall of the liquid crystal vessel 7. As a result, the surface of the liquid crystal 9 in the liquid crystal vessel 7 around the liquid crystal injecting port 5 is raised owing to the surface tension. At this time, the width of the surface raised portion 9a becomes greater than the diameter of the liquid crystal injecting port 5. Thus, although the width of the upper end of the plate spring 22 is smaller than the diameter of the liquid crystal injecting port 5, the width of the surface raised portion 9a of the liquid crystal 9 can be greater than the diameter of the liquid crystal injecting port 5, if the width of the liquid crystal vessel 7 is slightly greater than the diameter of the liquid crystal injecting port 5. Therefore, according to this embodiment, the liquid crystal 9 in the liquid crystal vessel 7 can be satisfactorily injected into the inner space of the liquid crystal cell 4 through the liquid crystal injecting port 5.

In the third and fifth embodiments as described above, the chamber 6 is not illustrated but it covers the liquid crystal vessel 7 and the liquid crystal cell 4 as in the other embodiments shown in FIGS. 1A, 2A, and 4A, and the liquid crystal vessel 7 holds enough amount of liquid crystal 9 to fully fill the inner space of the cell 4. Further, if the length of the liquid crystal vessel 7 is relatively long, it is possible to detect the liquid level of the liquid crystal 9 by means of the liquid level detecting sensor 14 and to supply the liquid crystal 9 to the vessel 7 through the liquid crystal supplying pipe 11 as shown in FIG. 1A. It is also possible to arrange a plurality of coil springs 21 or plate springs 22 in the vessel 7, so that the liquid crystal 9 can be injected into a plurality of liquid crystal cells 4 simultaneously.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A liquid crystal injecting method, for injecting a liquid crystal into an inner space of a liquid crystal cell through a liquid crystal injection port formed therein, comprising the steps of:

detecting a liquid level of a liquid crystal contained in a liquid crystal vessel;

supplying liquid crystal to the liquid crystal vessel based on a result of the step of detecting the liquid level of the liquid crystal;

forming a surface raised portion of the liquid crystal by raising a part of the liquid crystal to a level higher than the surrounding part thereof;

dipping the liquid crystal injecting port of the liquid crystal cell into the surface raised portion of the liquid crystal; and injecting the liquid crystal into the inner space of the liquid crystal cell through the liquid crystal injecting port.

2. The liquid crystal injecting method according to claim 1, wherein the step of forming the surface raised portion of the liquid crystal is performed at the same time as the step of supplying liquid crystal to the liquid crystal vessel.

3. The liquid crystal injecting method according to claim 2, wherein the surface raised portion of the liquid crystal is formed by a coil spring provided in the liquid crystal vessel.

4. The liquid crystal injecting method according to claim 3, wherein a portion of the liquid crystal vessel at which the coil spring is provided has a width smaller than that of the liquid crystal cell but greater than the diameter of the liquid crystal injecting port of the liquid crystal cell.

5. The liquid crystal injecting method according to claim 2, wherein the surface raised portion of the liquid crystal is formed by a plate spring provided in the liquid crystal vessel.

6. The liquid crystal injecting method according to claim 5, wherein a portion of the liquid crystal vessel at which the plate spring is provided has a width smaller than that of the liquid crystal cell but greater than the diameter of the liquid crystal injecting port of the liquid crystal cell.

7. The liquid crystal injecting method according to claim 2, wherein the surface raised portion of the liquid crystal is formed by a projection having an opening and provided in the liquid crystal vessel.

8. The liquid crystal injecting method according to claim 1, wherein the surface raised portion of the liquid crystal is formed by a coil spring provided in the liquid crystal vessel.

9. The liquid crystal injecting method according to claim 1, wherein the surface raised portion of the liquid crystal is formed by a plate spring provided in the liquid crystal vessel.

10. The liquid crystal injecting method according to claim 1, wherein the surface raised portion of the liquid crystal is formed by a projection having an opening and provided in the liquid crystal vessel.

11. A liquid crystal injecting method for injecting a liquid crystal into an inner space of a liquid crystal cell through a liquid crystal injection port formed therein, comprising the steps of:

setting a liquid level of a liquid crystal contained in a liquid crystal vessel which includes a projection having an opening to a predetermined height;

forming a surface raised portion of the liquid crystal by raising a part of the liquid crystal by its surface tension in the opening of the projection of the liquid crystal vessel to a level higher than the projection;

dipping the liquid crystal injecting port of the liquid crystal cell into the surface raised portion of the liquid crystal; and injecting the liquid crystal into the inner space of the liquid crystal cell through the liquid crystal injecting port.

12. The liquid crystal injecting method according to claim 11, wherein the step of forming the surface raised portion of the liquid crystal is performed at the same time as the step of setting the liquid level to the predetermined height.

13. A liquid crystal injecting method for injecting a liquid crystal into an inner space of a liquid crystal cell through a liquid crystal injection port formed therein, comprising the steps of:

setting a liquid level of a liquid crystal contained in a liquid crystal vessel to a predetermined height;

forming a surface raised portion of the liquid crystal by raising a part of the liquid crystal to a level higher than the surrounding part thereof by a coil spring provided in the liquid crystal vessel;

dipping the liquid crystal injecting port of the liquid crystal cell into the surface raised portion of the liquid crystal; and injecting the liquid crystal into the inner space of the liquid crystal cell through the liquid crystal injecting port.

14. The liquid crystal injecting method according to claim 13, wherein the step of forming the surface raised portion of the liquid crystal is performed at the same time as the step of setting the liquid level to the predetermined height.

15. The liquid crystal injecting method according to claim 14, wherein a portion of the liquid crystal vessel at which the coil spring is provided has a width smaller than that of the liquid crystal cell but greater than the diameter of the liquid crystal injecting port of the liquid crystal cell.

16. A liquid crystal injecting method for injecting a liquid crystal into an inner space of a liquid crystal cell through a liquid crystal injection port formed therein, comprising the steps of:

setting a liquid level of a liquid crystal contained in a liquid crystal vessel to a predetermined height;

forming a surface raised portion of the liquid crystal by raising a part of the liquid crystal to a level higher than the surrounding part thereof by a plate spring provided in the liquid crystal vessel;

dipping the liquid crystal injecting port of the liquid crystal cell into the surface raised portion of the liquid crystal; and injecting the liquid crystal into the inner space of the liquid crystal cell through the liquid crystal injecting port.

17. The liquid crystal injecting method according to claim 16, wherein the step of forming the surface raised portion of the liquid crystal is performed at the same time as the step of setting the liquid level to the predetermined height.

18. The liquid crystal injecting method according to claim 17, wherein a portion of the liquid crystal vessel at which the plate spring is provided has a width smaller than that of the liquid crystal cell but greater than the diameter of the liquid crystal injecting port of the liquid crystal cell.

* * * * *